Mar. 6, 1923.
L. S. LACHMAN ET AL
METHOD OF WELDING WIRES OR RODS ON INTERSECTING LINES
Filed Feb. 28, 1922
1,447,792
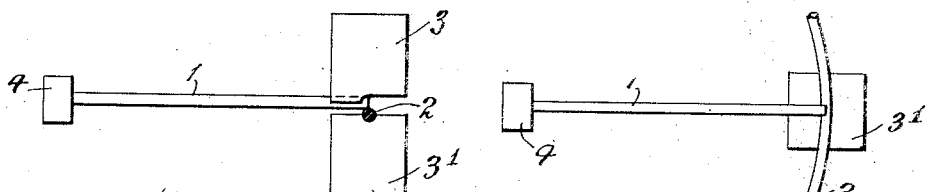
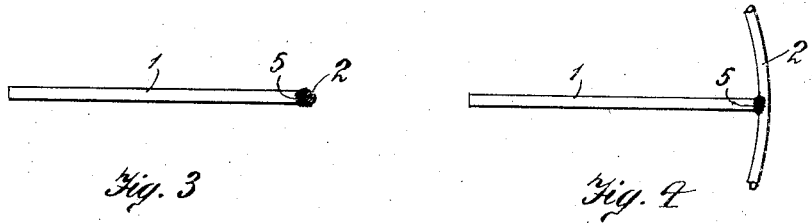
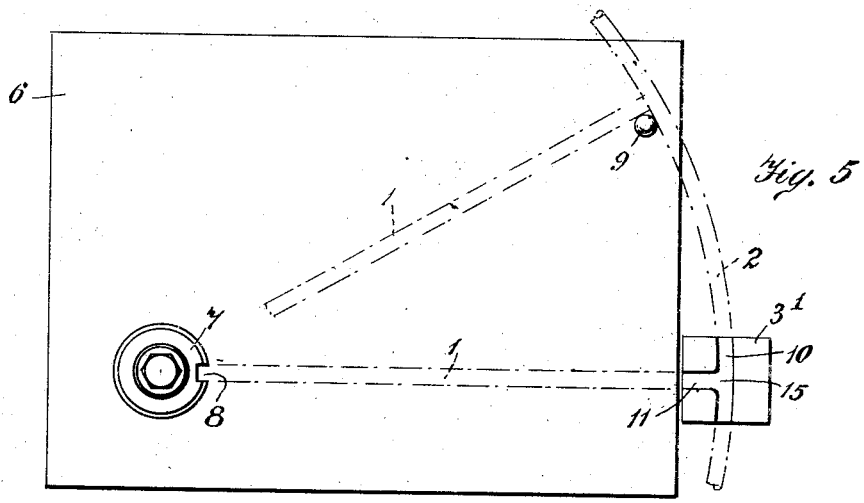
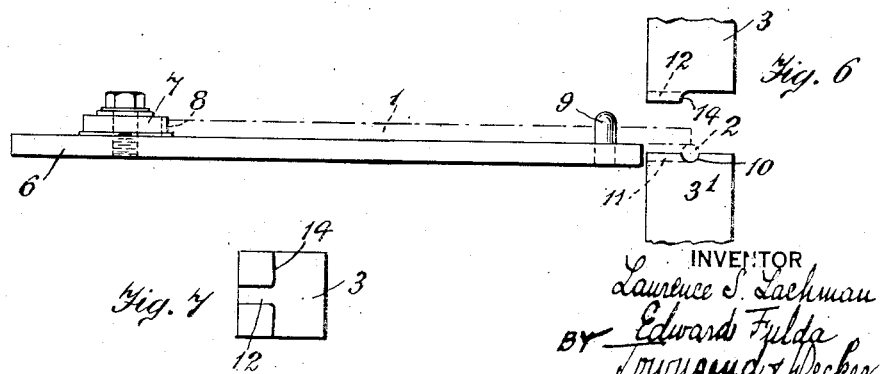
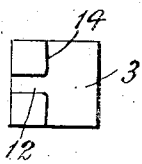

Patented Mar. 6, 1923.

1,447,792

UNITED STATES PATENT OFFICE.

LAURENCE S. LACHMAN AND EDWARD FULDA, OF NEW YORK, N. Y.

METHOD OF WELDING WIRES OR RODS ON INTERSECTING LINES.

Application filed February 28, 1922. Serial No. 539,899.

*To all whom it may concern:*

Be it known that we, LAURENCE S. LACHMAN and EDWARD FULDA, citizens of the United States, and residents of New York city, in the county of New York and State of New York, have invented certain new and useful Improvements in Methods of Welding Wires or Rods on Intersecting Lines, of which the following is a specification.

Our invention relates to the method of forming an electrical weld between the end of a rod and the side or edge of another member and is particularly adapted to welding the end of a rod to the rounded side of another member such as a wire and forming at the junction a weld having the substantial characteristics of one made by moving the parts against one another in the direction of the longitudinal axis of the rod while heated by the electrical resistance method, the result in work being that the longitudinal axes of the two members welded together are made to occupy substantially the same plane.

Briefly stated our invention consists in overlapping the end of the rod upon the edge of the opposite member while the parts are assembled between a pair of welding dies, applying pressure by means of said dies to force them into the same plane while the end of the rod is heated to welding temperature and at the same time holding said rod against movement longitudinally away from the point of the weld under the force applied transversely by the welding dies.

Our invention is particularly useful for welding the end of a wire to the side of another wire to produce a welded joint having all the characteristics of a butt weld and in which the two wires or their longitudinal axes will intersect with one another and lie in substantially the same plane.

Our invention further consists in foregoing the upset metal at the weld into the corners or angles between the wire rod and the intersecting member to finish off the upset metal or the weld in the welding operation and prevent any roughness around the joint due to the presence of excess extruded fused or softened metal produced in the welding operation.

In the accompanying drawings:

Fig. 1 illustrates the method of applying our invention to the welding of the end of a wire to the side of a wire, the rod or wire which is end-welded being shown in side elevation and the rod or wire to whose side it is welded being shown in section.

Fig. 2 is a plan of the parts illustrated in Fig. 1.

Fig. 3 is a section through the weld in the line of the longitudinal axis of the rod which is butt welded at its end.

Fig. 4 is a plan showing the welded parts.

Fig. 5 is a plan of a preferred form of apparatus for practicing the invention, the upper die being removed.

Fig. 6 is a side elevation of said apparatus with the upper die in position.

Fig. 7 is a plan view of the work end of the upper die.

In the drawings 1 indicates the rod which is to be butt-welded to the side or edge of another member 2 shown, for illustration, as consisting of a wire which in Fig. 1 appears in cross-section. To effect a buttweld between the end of the rod 1 and the side of the rod 2 in which the parts, when the weld is finished, shall occupy the same general plane or a position in which the longitudinal axes of both members 1 and 2 shall lie in coinciding planes, the end of the rod 1 is overlapped upon the rod 2 as illustrated in Fig. 1. While said parts are held against displacement in the direction of the longitudinal axis of the rod 1, they are grasped between a pair of current supplying and pressure applying dies 3, 3′ applied directly over the point of engagement of said members and then, by the action of said dies after the parts in engagement have been heated to welding temperature, they are forced out of displaced position illustrated in Fig. 1 into the position illustrated in Fig. 3 so as to occupy substantially the same plane, that is to say, so that the longitudinal axes of the members 1 and 2 lie in the same plane. The effect is to weld the end of the rod 1 to the side of the rod 2 owing to the resistance of the parts to displacement transversely to the direction of the applied pressure. The resultant weld is in substance the same as the ordinary butt-welded joint formed by butt-welding the end of a rod against the side of another member in the usual manner of grasping the parts each in its own welding die or abutment and then forcing them towards one another in the direction of the longitudinal axis of the end butt-welded member 1.

The means employed according to our present invention for holding the parts against displacement in the direction of the axis of the rod may be of any desired character.

In Fig. 1 the rod 1 is shown abutted at its extremity against a stop 4 for this purpose. Wire member 2 may be located if desired in a transverse groove in the die 3' or may be otherwise held as desired against receding from the end of the rod 1. To hold the rod 1 against sidewise movement it may be received in the groove in the die 3 running transversely to the groove which holds the wire 2. So far as this particular expedient is concerned it will be obvious that other means may be employed in carrying out our invention.

In the preferred manner of practicing our invention we suitably form the dies so that the extruded metal at the point of weld will be forged by the direct pressure of the dies to the contour of the side of the member 2, as shown at the point 5, Figs. 3 and 4. A die suitable for this purpose is illustrated in Figs. 5 and 6 which show a preferred construction of apparatus for practicing the invention. In these figures we have shown the invention as applied to the welding of the ends of rods to the inside of a curved member 2 such as the rim of a circular spoke or skeleton construction having radiating members radiating from a common center. Said spokes or members are indicated at 1, Fig. 5. In this figure and in Fig. 6 a table for supporting the spokes or rods 1 during the operation of welding and forging is shown at 6. 7 indicates an abutment having a recess as indicated at 8, Fig. 5, to receive the end of the rod 1 and prevent it from moving back away from the welding point. Said abutment or stop disk may be suitably insulated from the table 6 and may, if desired, be adapted to turn to bring the point 8 into position for welding the spoke to the rim 2 at the desired point. Said table may be also furnished with a stop pin or pins 9 to assist in positioning the wire 1 and holding it against displacement sidewise.

The lower die 3' is provided with the curved groove 10 to receive the curved member 2 and with a groove 11 the axis of which intersects the axis of the groove 10 and into which the wire 1 may enter when the dies are brought together and the wire 1 is brought into the same plane with the wire 2.

The upper die 3 is formed on its face with a groove 12 which, like the groove 11, is adapted to fit upon the wire member 1 and the parts when welded are assembled with the end of one overlapping as shown in Fig. 6. The face of said die 3 is also furnished with a curved shoulder indicated at 14 which fits the curved edge of the member 2, from which curved shoulder the groove 12 extends with its bottom in practically the same plane as the lowermost portion of the shoulder 10.

The grooves above described in the faces of the dies gradually merge into one another where they intersect as indicated at 15 or, in other words, are cut away at the angles of their intersecting surfaces, thus allowing space at the point of weld for the reception of the extruded heated metal which, however, is confined in the grooved faces of the dies. By the forging and welding surfaces thus formed such extruded metal is caused to conform to the curve of the surface of the member 2 and is welded thereto on the side and upper portion of the member 2 and is also forged or forced into the angle or corner between the intersecting members, thus avoiding any roughness at this point or around the weld due to extruded or upset metal. Any extruded or upset metal that may be left on the top and outside of the member 2 may be subsequently flattened or conformed to the surface of the member 2 in another set of dies to cause the work to present a smooth finish.

What we claim as our invention is:—

1. The herein described method of forming a butt-weld between the end of a rod and the side of another member, consisting in overlapping the end of the rod upon said member and applying pressure to the overlapped parts while assembled between a pair of welding and heating dies to crowd them into the same plane, said rod being at such time held against longitudinal movement away from the point of weld.

2. The herein described method of forming an electrically butt-welded joint between the end of a rod and the side of another member, consisting in overlapping the end of the rod upon said member and forcing the parts into the same plane by the action of a pair of electric welding dies applied over the lapped portion of the rod and member while they are heated to welding temperature and while the said rod and member are held against displacement with relation to one another in the general direction of the longitudinal axis of the rod.

3. The herein described method of forming a butt-welded joint between the end of a rod and the side of another member, consisting in overlapping the end of the rod upon said member, grasping the overlapped part between a pair of electric welding dies and applying pressure by means of said dies to force them into the same plane while heated to welding temperature and while they are held against displacement with relation to one another in the direction of the axis of the rod and at the same time forging the softened extruded metal of the weld into the angle between the members.

4. The herein described method of forming an electrically welded union between the end of a rod and the side of another member, consisting in overlapping the end of the rod upon said member, applying transverse pressure and heating current by a pair of welding dies applied over the overlapped part while said parts are held against displacement in the line of the axis of the rod and forcing them into position in which their longitudinal axis will occupy the same plane and at the same time swaging the upset metal of the weld to the contour of the side of the member engaged by the rod.

5. The herein described method of butt-welding the end of a wire to the side of a wire, consisting in overlapping said end upon the opposite member, applying heating current and transverse pressure by a pair of welding dies while the members are held against displacement in the direction of the longitudinal axis of said butt-welded wire and forging and welding the extruded metal of the weld to the contour of the side of the wire by the action of said dies operating as forging dies.

6. The herein described method of butt-welding the end of a wire to the side of a wire, consisting in overlapping said end upon the opposite member, applying heating current and transverse pressure by a pair of welding dies while the members are held against displacement in the direction of the longitudinal axis of said butt-welded wire and forging and welding the extruded metal of the weld to the contour of the side of the wire by the action of said dies operating as forging dies and into the angle between the two members.

Signed at New York, in the county of New York and State of New York, this 27th day of February, A. D. 1922.

LAURENCE S. LACHMAN.
EDWARD FULDA.

Witnesses:
F. B. TOWNSEND,
GEORGE E. BROWN.